United States Patent [19]

Walters

[11] 4,397,070
[45] Aug. 9, 1983

[54] CRYOGENIC COOLER PULLER

[75] Inventor: Buford T. Walters, Woodbridge, Va.

[73] Assignee: The United States of America as represented by the Secretary of the Army, Washington, D.C.

[21] Appl. No.: 362,418

[22] Filed: Mar. 26, 1982

[51] Int. Cl.³ .............................................. B23P 19/04
[52] U.S. Cl. .................................................... 29/256
[58] Field of Search ................. 29/256, 263, 265, 266; 269/251

[56] References Cited

U.S. PATENT DOCUMENTS

| | | | |
|---|---|---|---|
| 3,325,885 | 6/1964 | Ziegler | 29/256 |
| 3,460,226 | 8/1969 | Hildebrand | 29/256 |

Primary Examiner—Robert C. Watson
Attorney, Agent, or Firm—Robert P. Gibson; Milton W. Lee; Aubrey J. Dunn

[57] ABSTRACT

A tool for removing a cryogenic cooler from a dewer-detector. The cooler has a flange which mounts onto the dewer through a hole on a large flange to which the dewer is mounted. The tool includes parts for holding the flange fixed with respect to a base plate and parts for attaching to the base of the cooler and moving the cooler with respect to the base.

1 Claim, 2 Drawing Figures

CRYOGENIC COOLER PULLER

The invention described herein may be manufactured, used, and licensed by the U.S. Government for governmental purposes without the payment of any royalties thereon.

BACKGROUND OF THE INVENTION

This invention is in the field of pulling tools. In particular, it is a tool for pulling a cryogenic cooler away from a dewer-detector head. The cooler and the dewer-detector head are assembled as follows: the dewer-detector head is screwed onto one side of a large flange with a circular opening in the center. The cooler includes a smaller flange with the cold finger extending therefrom and with an o-ring in a groove on the surface of this flange. A rubber mastic is applied to the o-ring and the small flange is inserted through the opening in the large flange to seat against the dewer-detector head. The cold finger thus extends into the dewer and is closely surrounded thereby. Set screws are inserted through holes in the small flange and screwed into holes in the dewer and tightened to hold the small flange in place. Finally, a rubber mastic is applied to cover the set screw heads and the back side of the small flange. Since the small flange is essentially potted into the large flange, one normally attempts dissembly by removing the screws holding the dewer-detector head to the large flange and by pulling on the dewer-detector head. Unfortunately, there is very little clearence between the cold finger and the adjacent (glass) wall of the dewer and the slightest rocking motion will cause the cold finger to contact and to break the dewer. Since a dewer is very expensive, this method of disassembly is unacceptable. The instant invention exerts a force to pull the small flange from the opening in the large flange (after the set screws are removed).

SUMMARY OF THE INVENTION

The invention is a pulling tool into which a large flange of a combination cryogenic cooler and a dewer-detector head is inserted. The cooler includes a small flange inserted through an opening in the large flange and held by set screws to the dewer. The puller includes a drop plate for holding the large flange immovable with respect to a base plate, and a slide plate movable with respect to the base plate by a lead screw. The slide plate has means for grasping the base of the cooler such that when the slide plate is moved away from the large flange by the lead screw, the small flange is pulled from the opening in the large flange. Naturally, it is necessary first to remove the set screws through the small flange.

DESCRIPTION OF THE PREFERRED EMBODIMENTS

Figure 1:
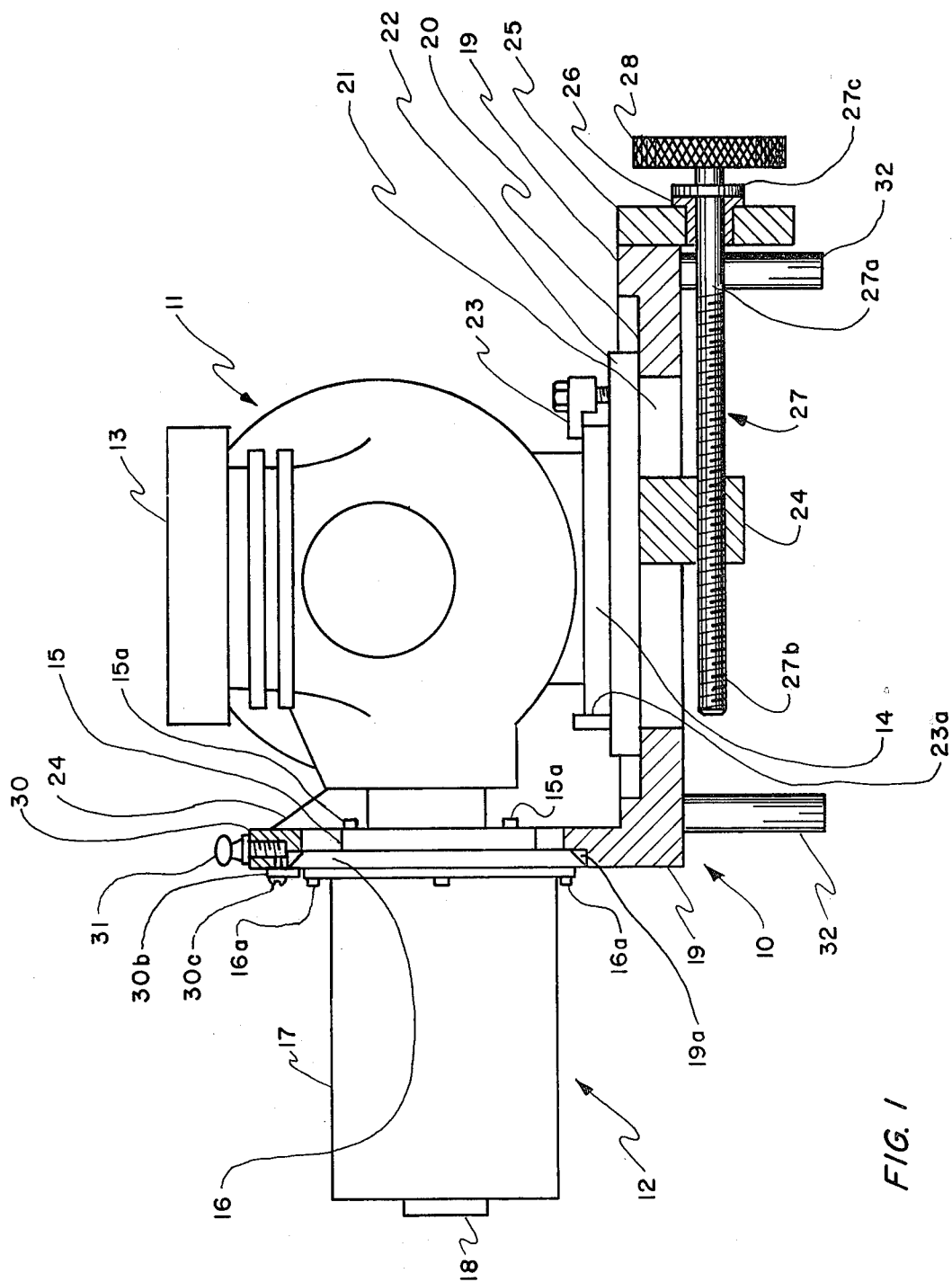
FIG. 1 shows a side sectional view taken on line I—I of FIG. 2 of the invention tool, with a cooler and dewer-detector combination in the tool.

The invention may be best understood when this description is taken in conjunction with the drawings. FIG. 1 shows the inventive tool generally designated 10 with the combination of the cooler 11 and dewer-detector 12 mounted in 10. Cooler 11 includes a housing with a compressor portion 13, a base portion 14, and a cold finger flange 15. Flange 15 fits into an opening through mounting flange 16 of dewer-detector 12, bears against dewer 17 and is held by set screws 15a onto 17. Dewer 17 is held onto flange 16 by set screws 16a. Numberal 18 designates the detector of dewer-detector 12. Tool 10 includes generally flat and rectangular base plate 19, with trough 20 extending from end to end of thereof and with generally rectangular slot 21 through the bottom of trough 20. In trough 20 is rectangular slide plate 22 with clamps 23 and posts 23a (only one each of 23 and 23a can be seen in the drawings) on top and screw nut 24 on the bottom and extending through slot 21. Mounted on one end of base plate 19 is end plate 25 bored out from bushing 26, through which the unthreaded portion 27a of lead screw 27 extends. The thread portion 27b of 27 is threaded into screw nut 24, and the other end of 27 has a flange 27c bearing against bushing 26. Knob 28 is fixed onto the end of 27 extending past flange 27c. Extending upwardly from base plate 19 are two parallel side plates 29, only one of which can be seen in FIG. 1. One of plates 29 is cut away to provide clearence for compressor 13. The surfaces of plates 29 which face each other each have a groove therein to accept respective tongues of drop plate 30 with handle 31. This drop plate has a partly semicircular cut-out of diameter equal to the diameter of flange 16. Tool 10 is supported by feet 32.

When the cooler art dewer-detector combination is placed in tool 10, base 14 of the combination sits on slide plate 22 and is held by clamps 23 and posts 23a, and flange 16 fits between side plates 29 (except for part of 13) with the bottom of flange 16 in an arcuate cut-out in base 19. Drop plate 30 is inserted and holds flange 16 immovable with respect to base plate 19, knob 28 is turned and lead screw 27 turns and moves screw nut 24 toward the right in the drawing; 11, 12, 13, 14 and 15 thus move to the right and 15 is pulled away from 17 and out of 16. Drop plate 30 may then be lifted out of the grooves in side plates 29, dewer-detector 12 removed, clamps 23 loosened, and cooler 11 removed from tool 10.

Figure 2:
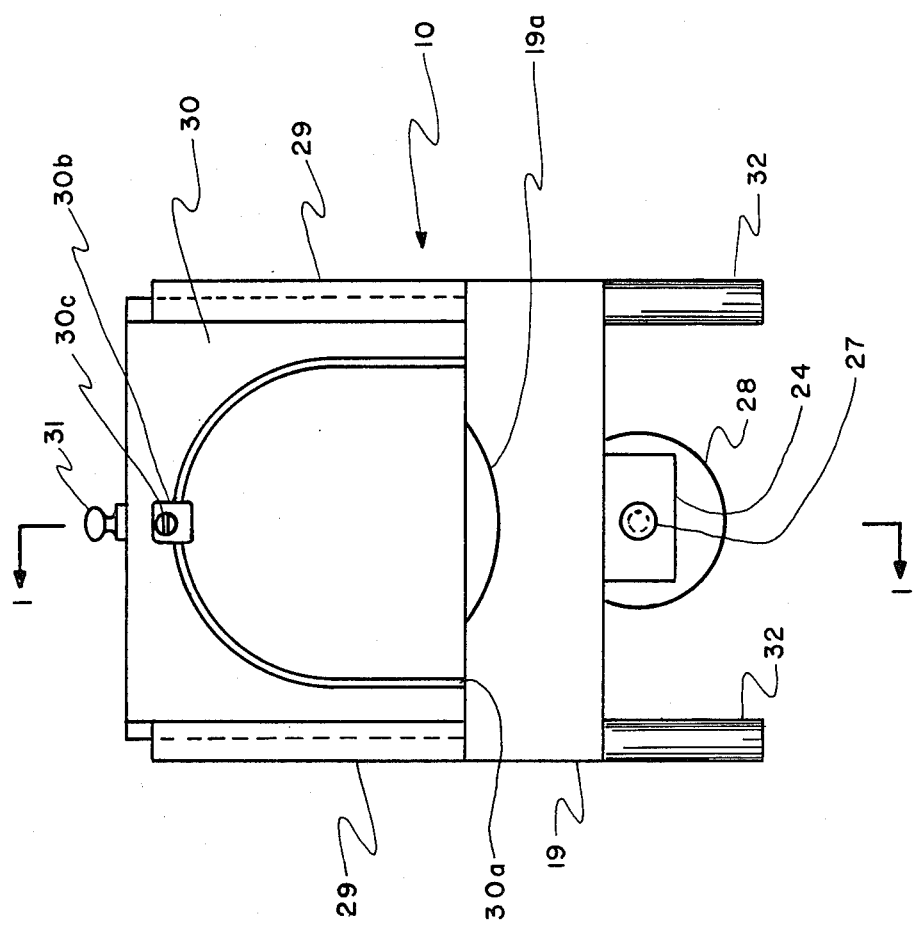
FIG. 2 shows an end view of the tool.

FIG. 2 shows some of the details of tool 10. Specifically, both of side plates 29 can be seen, and accurate cut-out 19a of base plate 19 (into which the bottom of flange 16 fits), and groove 30a of drop plate 30 (which groove fits around flange 16), and tab 30b with set screw 30c (which prevent flange 16 from falling out of 30a when flange 15 is pulled away).

I claim:

1. A tool for extracting a cryogenic cooler from a dewer-detector wherein said cooler has at least a housing and a cold finger flange on said housing, and said dewer-detector includes a mounting flange with a bore therethrough and with a dewer mounted on said flange, wherein said cold finger flange is mounted in said bore and attached by set screws to said dewer, said tool including:

a base plate having a rectangular longitudinal trough therein, a generally rectangular slot through the bottom of said trough, an arcuate cut-out shaped like a portion of said mounting flange;

two side plates mounted orthogonally on opposite sides of said base plate and parallel to each other and each having a slot on their facing sides adjacent to said cut-out;

a slide plate mounted in said trough and having a screw nut extending through said slot and having retaining clamps on the side opposite said screw nut;

an end plate secured to said base plate on the end opposite said cut-out and with a bore therethrough;

a lead screw having a threaded portion and an unthreaded portion with said threaded portion screwed into said screw nut and with said unthreaded portion extending through said bore of said end plate;

a drop plate having a cut-out therein corresponding to the shape of said mounting flange and having a tongue on each side adapted to fit into said slots of said side plates, whereby said cooler is extracted by removing said set screws, inserting the still assembled cooler and dewer-detector into the tool such that said housing of said coller fits into said clamps of said slide plate and whereby said mounting flange fits into the cut-out of said base plate, whereby the tongues of said drop plates are then inserted into said slots of said side plates such that said drop plate fits around and retains said mounting flange, and whereby said lead screw is rotated to cause said slide to move with respect to said base plate and to pull on said housing of said cooler such that said cold finger flange is pulled from said mounting flange.

* * * * *